(12) United States Patent
Takahashi (10) Patent No.: US 8,113,545 B2
(45) Date of Patent: Feb. 14, 2012

(54) ROTARY JOINT

(75) Inventor: Hidekazu Takahashi, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 744 days.

(21) Appl. No.: 12/159,564

(22) PCT Filed: Dec. 21, 2006

(86) PCT No.: PCT/JP2006/325558
§ 371 (c)(1),
(2), (4) Date: Jun. 27, 2008

(87) PCT Pub. No.: WO2007/074721
PCT Pub. Date: Jul. 5, 2007

(65) Prior Publication Data
US 2011/0049870 A1 Mar. 3, 2011

(30) Foreign Application Priority Data

Dec. 28, 2005 (JP) ................. 2005-379210

(51) Int. Cl.
*F16L 27/00* (2006.01)
(52) U.S. Cl. .......... 285/272; 277/361; 277/408
(58) Field of Classification Search .......... 285/272, 285/273, 281; 277/358, 361, 408
See application file for complete search history.

(56) References Cited

U.S. PATENT DOCUMENTS

| | | | | |
|---|---|---|---|---|
| 1,683,756 A | * | 9/1928 | Blache | 277/361 |
| 2,772,897 A | * | 12/1956 | Shaw et al. | 277/408 |
| 3,021,146 A | * | 2/1962 | Sommer et al. | 277/408 |
| 3,081,095 A | * | 3/1963 | Hamrick | 277/361 |
| 3,968,969 A | * | 7/1976 | Mayer et al. | 277/408 |
| 4,111,468 A | * | 9/1978 | Schneider | 285/281 |
| 4,872,517 A | * | 10/1989 | Shaw et al. | 277/358 |
| 5,080,401 A | * | 1/1992 | Stich | 285/281 |
| 5,199,748 A | | 4/1993 | Jung et al. | |
| 5,351,972 A | * | 10/1994 | Anderberg | 277/408 |
| 5,895,077 A | | 4/1999 | Sigmundstad | |
| 6,186,509 B1 | * | 2/2001 | Wada et al. | 277/363 |
| 6,216,977 B1 | | 4/2001 | Setzer et al. | |

(Continued)

FOREIGN PATENT DOCUMENTS

DE 40 18 106 A1 12/1990
EP 0 981 000 A1 2/2000

(Continued)

*Primary Examiner* — David E Bochna
(74) *Attorney, Agent, or Firm* — Arent Fox, LLP (57) ABSTRACT

A rotary joint having a stationary section (60) having a fluid path (6) in which sealed fluid flows; a sleeve (30) having in it a second connection fluid path (6C) in which the fluid from the fluid path flows, rotatable relative to the stationary section, and made of a rustless material; a rotary seal ring (2) having a first connection fluid path (6B) that has an inner peripheral surface fitting on the outer peripheral surface of the sleeve so as to be connectable to the second connection fluid path, having a first seal surface (2A) on one side face of the rotary seal ring (2), and having a second seal surface (2B) on the other side face of the rotary seal ring (2); a first stationary seal ring (10) having a first relative seal surface (10S) in intimate contact with the first seal surface; and a second stationary seal ring (11) having a second relative seal surface (11S) in intimate contact with the second seal surface and enabling the fluid path and the first connection fluid path to be connection to a space between the first stationary seal ring (10) and the second stationary seal ring (11).

3 Claims, 4 Drawing Sheets

U.S. PATENT DOCUMENTS

2001/0052676 A1    12/2001    Omiya et al.

FOREIGN PATENT DOCUMENTS

| | | |
|---|---|---|
| JP | 8-512391 A | 12/1996 |
| JP | 11-336970 A | 12/1999 |
| JP | 11-336971 A | 12/1999 |
| JP | 2002-005380 A | 1/2002 |
| JP | 2004-084691 A | 3/2004 |
| JP | 2004-316775 A | 11/2004 |
| WO | WO 95/02146 A1 | 1/1995 |

* cited by examiner

ROTARY JOINT

CROSS-REFERENCE TO RELATED APPLICATION

This application is a National Stage entry of International Application No. PCT/JP2006/325558, filed Dec. 21, 2006, the entire specification claims and drawings of which are incorporated herewith by reference.

TECHNICAL FIELD

The present invention relates to a rotary joint in which in order to supply fluids of different types or the same type from a supplying device to a rotating device for working without mixing the fluids, communicating passages provided in relatively rotating components belonging to the respective devices are communicatively connected to each other. More particularly, the present invention relates to a rotary joint that facilitates replacement of each of the components when the supply fluids rust the component or cause failure of the component, and prevents rust powder from being mixed into the fluids.

BACKGROUND ART

Figure 4:
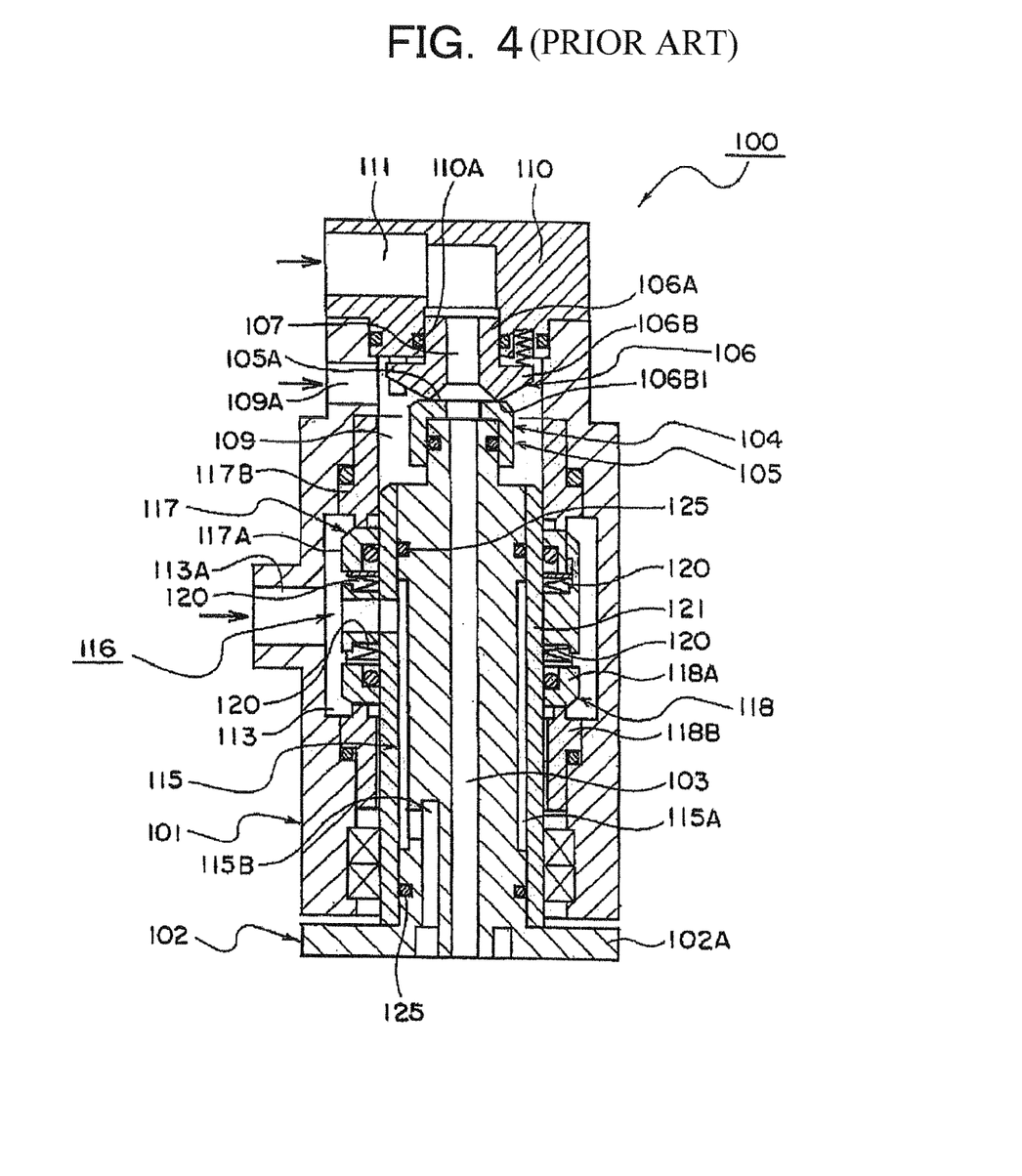
FIG. 4 is a full cross-sectional view of a prior rotary joint

Technology related to the present invention includes a rotary joint illustrated in FIG. 4 (see, for example, Patent document 1 or 2 described in the paragraph) [0009]). FIG. 4 is a cross-sectional view of the rotary joint. The rotary joint 100 is intended to be equipped for a pipe passage of surface polishing equipment for polishing a surface of a silicon wafer. The rotary joint 100 is provided with a cylindrical joint body 101. An inner circumferential surface of the joint body 101 is rotatably fitted with a rotation body 102. At one end of the rotation body 102, a flange part 102A is provided, which is connected to an unshown polishing pad. The flange part 102A is connected such that a fluid passage for slurry 103 provided in the rotation body 102 and that in the polishing pad are communicatively connected to each other.

At an upper end part of the rotation body 102 illustrated in FIG. 4, a cap-like rotary seal ring 105 is fitted via an O-ring. The rotary seal ring 105 is provided at the center thereof with a fluid passage for slurry 103, which is communicatively connected to the fluid passage for slurry 103 in the rotation body 102, and a top surface surrounding the fluid passage for slurry 103 is provided with a sealing surface 105A. The rotary seal ring 105 is made of silicon carbide.

In a position facing to the rotary seal ring 105, a fixed seal ring 106 is provided. A cylindrical part 106A of the fixed seal ring 106 is movably fitted into an inner circumferential surface 110A of a head cover 110 provided at an end part of the joint body 101. On a top surface of the fixed seal ring 106, an opposed sealing surface 106B 1 coming into close contact with the sealing surface 105A is formed. Also, an inner circumferential surface passing through the fixed seal ring 106 forms an intermediate passage 107. The intermediate passage 107 is communicatively connected to the fluid passage for slurry 103 and a supply passage 11 to circulate fluid containing slurry. The fixed seal ring 106 is pressed toward the rotary seal ring 105 by a spring to bring the sealing surface 105A and opposed sealing surface 106B1 into close contact with each other. The fluid containing slurry passing through the intermediate passage 107 intrudes into a fitting portion between the inner circumferential surface 110A and the cylindrical part 106A over a long period of time. This causes rust on the inner circumferential surface 110A, so that a sealing state of the opposed sealing surface 106B1 of the fixed seal ring 106 operated by spring force with respect to the sealing surface 105A is deteriorated. In addition, the rotary seal ring 105 and fixed seal ring 106 constitute a first mechanical seal device 104.

Also, on an outer circumferential side of the first mechanical seal device 104, a cooling passage 109 is formed between the first mechanical seal device 104 and the joint body 101. The cooling passage 109 is communicatively connected to a cooling inlet 109A and an unshown outlet, and cooling water flowed into the cooling passage 109 from the cooling inlet 109A is returned outside from the outlet. Further, inside the cooling passage 109, the rotary seal ring 105 is fitted in the upper end part of the rotation body 102, so that the cooling water intrudes into a fitting portion between the rotation body 102 and the rotary seal ring 105. As a result, the cooling water rusts a fitting surface of the rotation body 102, so that it becomes difficult to remove the rotary seal ring 105 from the rotation body 102 when the sealing surface 105A is replaced due to wear.

Further, the joint body 101 is provided on an inner circumference thereof with a ring-like fluid passage for non-slurry 113 communicatively connected to a fluid passage port 113A. The fluid passage 113 is communicatively connected to a circulation passage 115 provided in the rotation body 102. At a connection part between the circulation passage 115 and the fluid passage for non-slurry 113, a second mechanical seal device 116 is arranged. The second mechanical seal device 116 substantially consists of third and fourth mechanical seals 117 and 118 arranged in the fluid passage for non-slurry 113. Also, if fluid such as pure water is circulated in the circulation passage 115, wear is accelerated simultaneously with heat generation because the pure water or the like has no lubrication effect on each sealing surface of the second mechanical seal device 116 as compared with industrial water or the like.

The third mechanical seal 117 substantially consists of a first rotary seal ring 117A slidably fitted into the rotation body 102 and a first fixed seal ring 117B fastened to the joint body 101. Also, the fourth mechanical seal 118 substantially consists of a second rotary seal ring 118A fitted into the rotation body 102 slidably in a shaft direction and a second fixed seal ring 118B fastened to the joint body 101. The first and second rotary seal rings 117A and 118A are pressed toward the first and second fixed seal rings 117B and 118B by repulsive force of their associated leaf springs 120 and 120, respectively.

Also, an outer circumferential surface of the rotation body 102 is provided with annular grooves, in both of which O-rings 125 and 125 are arranged, and a sleeve 121 is fitted into the outer circumferential surface of the rotation body 102 to form a first circulation passage 115A. Further, a second circulation passage 115B communicatively connected to the first circulation passage 115A is formed of a hole provided in the rotation body 102. The first and second circulation passages 115A and 115B constitute the circulation passage 115. The fluid flowed into the circulation passage 115 also intrudes into a fitting portion between the rotation body 102 and the sleeve 121 when flowing through the first circulation passage 115A. This rusts the fitting portion between the rotation body 102 and the sleeve 121 over a long period of time, and therefore makes it difficult to remove the sleeve 121 from the rotation body 102 when the second mechanical seal device 116 is replaced.

Patent document 1: FIG. 1 in Japanese published unexamined patent application No. H11-287372
Patent document 2: FIG. 1 in Japanese published unexamined patent application No. 2001-141150

As described above, when a sealing surface of a mechanical seal is worn or damaged, components attaching the mechanical seal must also be replaced. The current problem is that supply fluid intrudes between joining surfaces of the assembled components for the mechanical seal to cause rust. The rust or the like sticks the components to each other, which in turn makes it difficult to replace the components and also impossible to disassemble the mechanical seal. Further, the rust between the components flows with being mixed into the supply fluid, which also causes trouble to a precisely machined surface or the like to be processed.

DISCLOSURE OF INVENTION

Problem to be Solved by the Invention

The present invention is made in consideration of the above problems. A purpose of the present invention to solve such problems is to prevent the supply fluid (also referred to as process fluid or sealed fluid) from causing the rust between the respective components. Another object is to facilitate the disassembly of the components when the components are replaced. Still another object is to reduce assembly cost of the components upon assembly of the rotary joint, and also replacement cost of the assembled components.

Yet another object is to obtain a rotary joint that prevents the machined surface to be processed from the trouble due to the rust between the respective components flowing together with the supply fluid. Still yet another object is to enable a mechanical seal in the rotary joint to exert its sealing capability to thereby prevent attachment of the supply fluid leaking from the mechanical seal to a processing product.

Means for Solving Problem

The present invention is made to solve the technical problems described above, and technical means for solving the problems is configured as follows.

A rotary joint according to the present invention is capable of circulating sealed fluid without leaking it outside a fluid passage even upon relative rotation of a fluid passage in a fixed part and a fluid passage in a rotating sleeve, and comprises: said fixed part having the fluid passage through which said sealed fluid flows; the sleeve made of a rustless material, the sleeve having inside a second connecting fluid passage through which supply fluid from said fluid passage flows, and having an inner circumferential surface capable of being fitted into an outer circumferential surface of a rotary shaft; a rotary seal ring having an inner circumferential surface fitted into an outer circumferential surface of said sleeve, a first connecting fluid passage passing through said inner circumferential surface to be communicatively connected to said second connecting fluid passage, a first sealing surface on one side surface, and a second sealing surface on other side surface; a first stationary seal ring having a first counterpart sealing surface coming into close contact with said first sealing surface, and hermetically held by said fixed part; and a second stationary seal ring having a second counterpart sealing surface coming into close contact with said second sealing surface, hermetically held by said fixed part, and forming with said first stationary seal ring a fluid passage capable of making communicative connection between said fluid passage and said first connecting fluid passage.

Effect of the Invention

According to the rotary joint of the present invention, the second connecting fluid passage through which the supply fluid for processing a machined surface is formed inside the sleeve made of the rustless material, so that the supply fluid does not intrude into a joining portion between the sleeve and the rotary shaft, and therefore an effect of preventing appearance of rust in the joining portion between the sleeve and the rotary shaft due to the supply fluid is produced. The rotary seal ring fitted in the sleeve made of the rustless material can also prevent the appearance of rust on the fitting surface because of the presence of the sleeve made of the rustless material. For this reason, the appearance of rust between the sleeve and the rotary shaft and between the sleeve and the rotary seal ring can be prevented, so that it becomes possible to easily disassemble the sleeve and the rotary shaft, or the sleeve and the rotary seal ring when each of the seal rings is worn or damaged. As a result, an effect of significantly facilitating the replacement of a component such as the each of the seal rings is produced. Also, there is produced an effect of preventing the machined surface to be processed by the supply fluid from being made defective by rust being mixed into and flowing with the supply fluid. Further, there is no appearance of rust on the fitting surfaces of the sleeve and rotary shaft, so that the sleeve can be easily replaced from the rotary shaft incorporated in a machine. For this reason, an effect capable of significantly reducing cost for assembling or disassembling components in the mechanical seal or rotary joint is produced.

EXPLANATIONS OF LETTERS OR NUMERALS

1: Rotary joint
2: First rotary seal ring
2A: First sealing surface
2B: Second sealing surface
2H: First engaging hole
3: Second rotary seal ring
3S1: Third sealing surface
3S2: Fourth sealing surface
4: Third fixed seal ring
4S: Third opposed sealing surface
5: Fourth fixed seal ring
5S: Fourth opposed sealing surface
6: Fluid passage
6A: Communicatively connecting fluid passage
6B: First connecting fluid passage
6C: Second connecting fluid passage
6C1: Radially second connecting fluid passage
10: First stationary seal ring
10C: First inner circumferential surface
10K: First tapered surface
10S: First counterpart sealing surface
11: Second stationary seal ring
11C: Second inner circumferential surface
11K: Second tapered surface
11S: Second counterpart sealing surface
15A: First O-ring
15S: Second O-ring
16: Vacuum passage 16A: Third vacuum passage
16C: Second connecting vacuum passage
16D: First connecting vacuum passage
18A: First opposed tapered surface
18B: Second opposed tapered surface
20: Connection part
20B: O-ring groove
20H: Joining surface,
20S: Inner circumferential surface
26: Passage
26A: First passage
26B: Fifth passage
26C: Second passage
26D: Third passage
26E: Fourth passage
30: Sleeve
30A: Outer circumferential surface
30B: Other end surface
30C: Inner circumferential surface
30D: First fixing hole
30H: Pin hole
30W: Screw hole
32: O-ring
35A: First seal ring
35B: Second seal ring
50: Rotary shaft
60: Housing
62C: Space (Vacant space)

BEST MODE FOR CARRYING OUT THE
INVENTION

Figure 1:
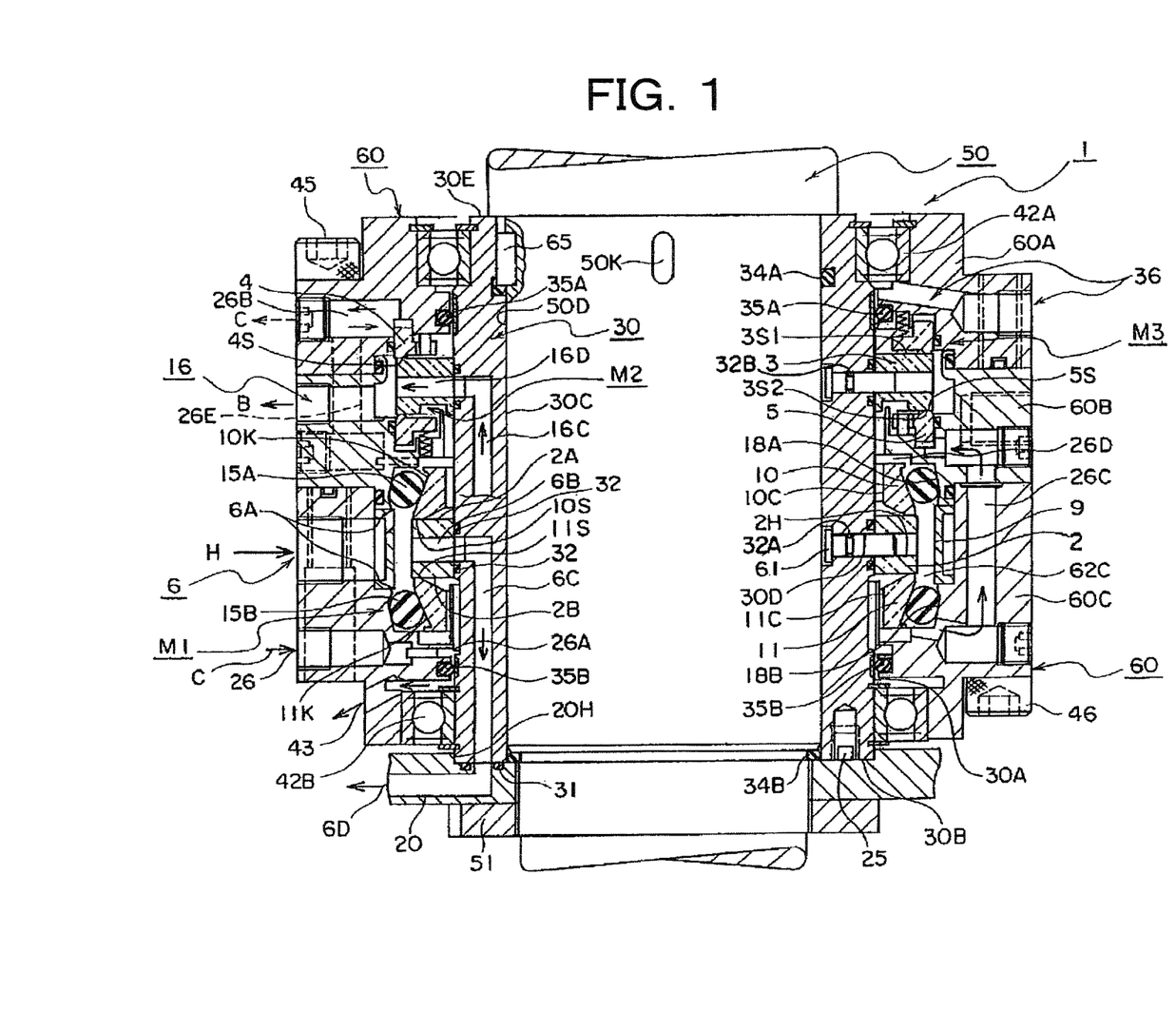
FIG. 1 is a full cross-sectional view of a rotary joint according to a first embodiment of the present invention.
Figure 2:
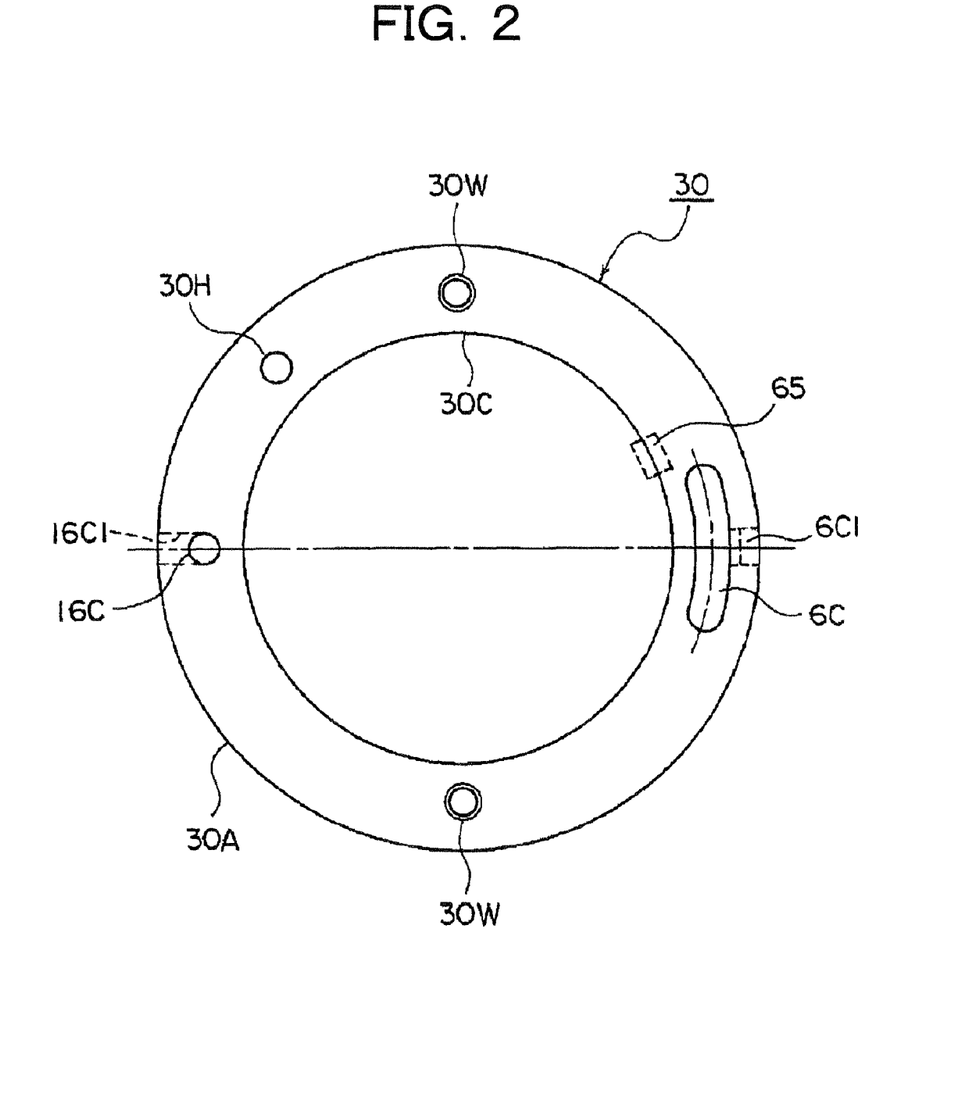
FIG. 2 is a front view of the other end surface side of a sleeve illustrated in FIG. 1.
Figure 3:
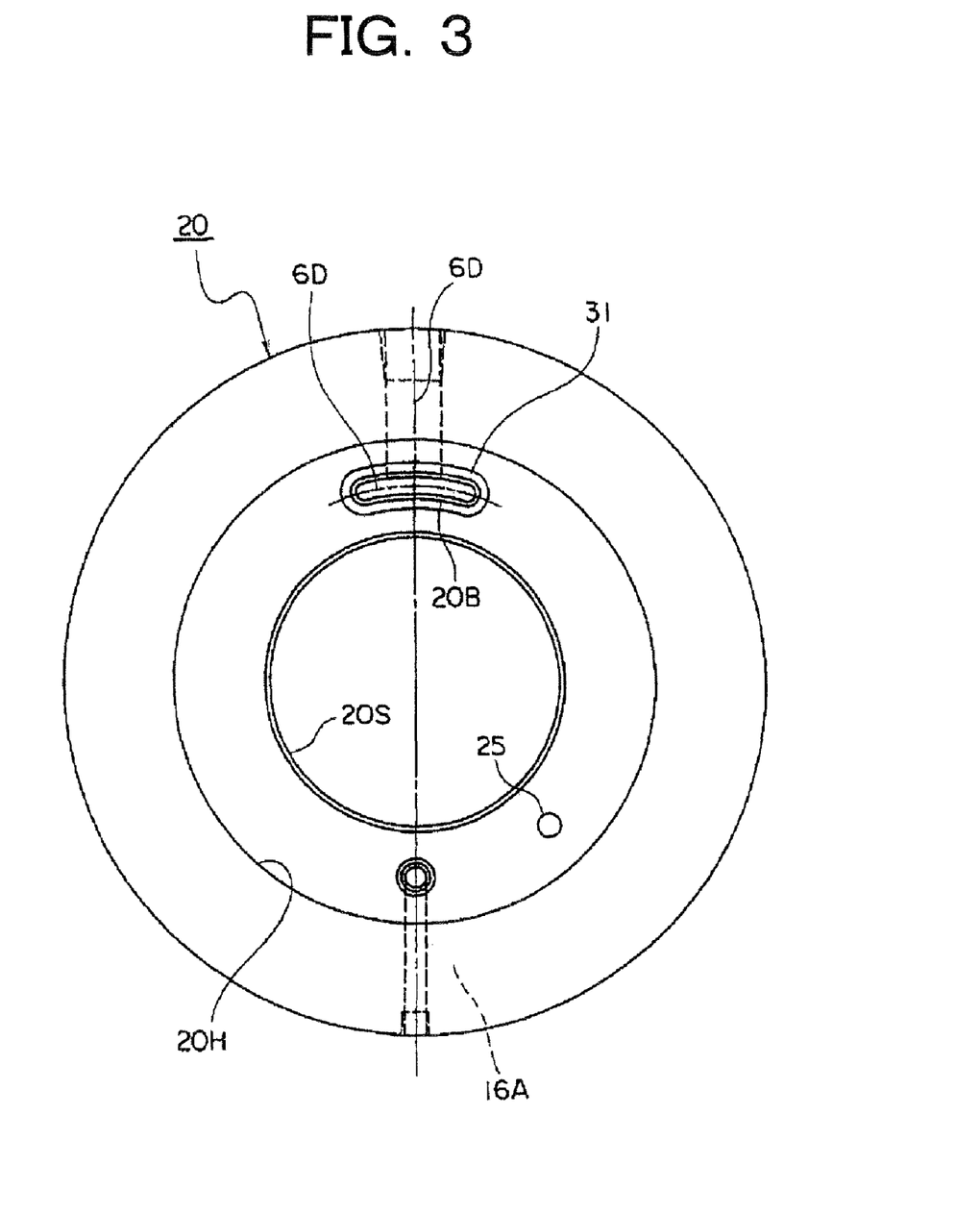
FIG. 3 is a front view of a fitting surface side of a connection part illustrated in FIG. 1.

Preferred embodiments of a rotary joint according to the present invention will hereinafter be described with reference to the drawings. FIG. 1 is a full cross-sectional view of a rotary joint 1 according to a first embodiment of the present invention. FIG. 2 is a front view of a sleeve 30 illustrated in FIG. 1 as viewed from the other end surface 30B side. FIG. 3 is a front view of a connection part 20 as viewed from the sleeve 30 side. A description of FIG. 1 will be given below, also with reference to Reference numerals in FIGS. 2 and 3.

In FIG. 1, Reference numeral 1 represents the rotary joint. In the rotary joint 1, a rotary shaft 50 is vertically fitted, with the connection part 20 being on the lower side. The rotary joint 1 is a device adapted to prevent supply fluid (also referred to as process fluid or sealed fluid) H flowing through a fluid passage 6 passing across respective fitting surfaces between the sleeve 30 fitted into the rotary shaft 50 and a housing (also referred to as a fixed part) 60, which rotationally move relative to each other, from leaking outside the circulation passage from between the fitting surfaces even during the relative rotation. Note that the fluid passage 6 through which the supply fluid H flows includes the communicatively connecting fluid passage 6A, first connecting fluid passage 6B, second connecting fluid passage 6C, and third connecting fluid passage 6D.

Although not illustrated in FIG. 1, a polishing solution supplying device for supplying the supply fluid H composed of a polishing agent solution to the rotary joint 1 to perform a processing operation for a machined surface or the like is provided. A joint for piping connected to the polishing solution supplying device is adapted to be connectable to a pipe thread provided at an inlet of the fluid passage 6 of the rotary joint 1. Also, a joint for piping for introducing vacuum B from unshown vacuum apparatus is adapted to be connectable to a pipe thread provided at an inlet of a vacuum passage 16. Further, a joint for piping for flowing fluid C from an unshown liquid (clear water) supplying device is adapted to be connectable to a pipe thread provided at an inlet of a passage 26 for cleaning and cooling.

The rotary joint 1 is provided with the housing 60 forming a main body of an outer frame. Regarding the housing 60, a first housing 60A and a second housing 60B are joined in a shaft direction, and coupled with each other by a plurality of bolts 45 arrayed along one of sides. Similarly, the second housing 60B and a third housing 60C are joined, and coupled in the shaft direction by a plurality of bolts 46 from the other side. As a result, the housing 60 forms into a cylindrical body to form an inner circumferential surface. The respective components are joined at their end surfaces, and therefore can be easily disassembled by removing the bolts. On the inner circumferential surface of the housing 60, a first bearing 42A and a second bearing 42B are provided on both sides in the shaft direction. Also, an outer circumferential surface 50D of the rotary shaft 50 is fitted via a key 65 with the sleeve 30 that rotates integrally. Further, the rotary shaft 50 integral with the sleeve 30 is supported by the first and second bearings 42A and 42B on the both sides with being rotatable and prevented from relative movement in the shaft direction. Between the inner circumferential surface of the housing 60 and an outer circumferential surface 30A of the sleeve 30, a first seal ring 35A and a second seal ring 35B are respectively arranged on the first and second bearing 42A and 42B sides to form a space (also referred to as a vacant space) 62C therebetween. Note that the housing 60 is made of stainless steel; however, it may be made of metal such as steel, copper alloy, nickel alloy, or chromium alloy.

The housing 60 is provided with the fluid passage 6 for supplying the supply fluid H for a polishing solution, which passes from an outer circumferential surface thereof to the space (also referred to as the vacant space) 62C. Also, in a position on the first bearing 42A side of the fluid passage 6 of the housing 60 in the shaft direction, the vacuum passage 16 that passes from the outer circumferential surface to the space 62 and is intended for introducing the vacuum B is provided. Further, in a position on the second bearing 42B side of the fluid passage 6, the passage 26 that passes from the outer circumferential surface to the space 62C and is intended for supplying fluid for cooling and cleaning (cooling and cleaning fluid) C is provided. Still further, between the vacuum passage 16 and the first bearing 42A, a first drain hole 36 is provided. Yet further, between the passage 26 and the second bearing 42B, a second drain hole 43 is provided. The first and second drain holes 36 and 43 allow the fluids to flow outside in case where leakages occur from first and second mechanical seals M1 and M2, respectively.

In the space 62C between the outer circumferential surface 30A of the sleeve 30 and the inner circumferential surface of the housing 60, a pair of the first mechanical seals M1 symmetrical with respect to a radial direction is arranged. The first mechanical seals M1 hermetically fit a rotary seal ring 2 in the sleeve 30 at a position opposite to the inflow side of the supply fluid H in the fluid passage 6. Also, the rotary seal ring 2 is provided with the first connecting fluid passage 6B of the fluid passage 6, which passes through in the inflow and radial direction. Further, the rotary seal ring 2 is provided with first and second sealing surfaces 2A and 2B on both sides thereof, respectively. Still further, the rotary seal ring 2 is provided with a first engaging hole 2H passing through in the radial direction at a position on a side circumferentially 180-degree opposite to the first connecting fluid passage 6B. In a fitting portion of the rotary seal ring 2 being fitted in the sleeve 30, both sides of the first connecting fluid passage 6B and those of the first engaging hole 2H in the shaft direction are respectively fitted with O-rings 32 and 32 to prevent the fluid flowing from the first connecting fluid passage 6B to the second connecting fluid passage 6C from leaking into the fitting portion between the rotary seal ring 2 and the sleeve 30. In addition, as a material for the rotary seal ring 2, carbon, silicon carbide, hard metal, ceramic, or the like is used.

A first drive pin 71 engaging with a first fixing hole 30D of the sleeve 30 is locked into the first engaging hole 2H of the rotary seal ring 2 to connect both of the components together, and also to rotationally move the rotary seal ring 2 together with the rotation of the rotary shaft 30. Also, the first drive pin 61 is fitted into a first engaging hole 2H to hold both sealing surfaces 2A and 2B of the rotary seal ring 2 while preventing them from being deformed. Further, the first drive pin 61 is thermally treated to increase strength thereof. For this reason, the first drive pin 61 can be formed small in diameter, and also the rotary seal ring 2 can be configured small because a width thereof in the shaft direction can be reduced. In addition, the first drive pin 61 is provided with a groove for an O-ring on an outer circumferential surface thereof. Into the groove for an O-ring, an O-ring 32A is fitted to seal a fitting portion between the first drive pin 61 and the first fixing hole 30D. The O-ring 32A prevents the supply fluid H in the space 62C from intruding onto the outer circumferential surface 50D of the rotary shaft 50.

On the first sealing surface 2A side of the rotary seal ring 2, a first stationary seal ring 10 provided with a first counterpart sealing surface 10S coming into close contact with the first sealing surface 2A is arranged. Also, on the second sealing surface 2B side, a second stationary seal ring 11 provided with a second counterpart sealing surface 11S coming into close contact with the second sealing surface 2B is arranged. Regarding the first stationary seal ring 10, an outer circumferential surface is formed into a first tapered surface 10K, which is to be brought into press contact with a first O-ring 15A, and a first inner circumferential surface 10C forms with the outer circumferential surface 30A of the sleeve 30 a gap through which the cooling and cleaning fluid C flows. Also, regarding the second stationary seal ring 11, an outer circumferential surface is formed into a second tapered surface 11K, which is to be brought into press contact with a second O-ring 15B, and a second inner circumferential surface 11C forms with the outer circumferential surface 30A of the sleeve 30 a gap through which the cooling and cleaning fluid C flows. For these reasons, the first and second stationary seal rings 10 and 11 can be easily fitted to and removed from the sleeve 30 because the circumferential surfaces of both of the components are configured not to be fitted in other components, differently from a conventional configuration.

Also, the first and second stationary rings 10 and 11 are formed in almost the same shape, and therefore can be symmetrically arranged. For this reason, machining cost can be reduced by employing the same machining method because of the respective stationary seal rings 10 and 11 having the same shape. Further, the respective stationary seal rings 10 and 11 do not have different shapes, so that the number of components to be machined can be reduced. As a result, the whole of them is made compact, so that the rotary joint 1 can also be formed small. Accordingly, an effect of reducing the entire cost can be expected. In addition, the rotary seal ring 2, and first and second stationary seal rings 10 and 11 are fabricated from a rustless material such as a hard alloy including silicon carbide, carbon, ceramic, Ni, or Cr.

On a surface of the housing 60 facing to the first tapered surface 10K of the first stationary seal ring 10, a first opposed tapered surface 18A is formed. Also, on a surface of the housing 60 facing to the second tapered surface 11K of the second stationary seal ring 11, a second opposed tapered surface 18B is formed. Gaps between the first opposed tapered surface 18A and the first tapered surface 10K and between the second opposed tapered surface 18B and the second tapered surface 11K are formed so as to gradually narrow toward a middle surface of a radial direction between the first and second stationary seal rings 10 and 11. Also, between the first opposed tapered surface 18A and the first tapered surface 10K, the first elastic seal ring (hereinafter referred to as the first O-ring) 15A made of a rubber or elastic resin material is arranged. The first O-ring 15A brings the first counterpart sealing surface 10S of the first stationary seal ring 10 into press contact with the first sealing surface 2A by repulsive force thereof, as well as sealing the gap between the first tapered surface 10K and the first opposed tapered surface 18A. Also, between the second opposed tapered surface 18B and the second tapered surface 11K, the second elastic seal ring (hereinafter referred to as the second O-ring) 15B made of a rubber or elastic resin material is arranged. The second O-ring 15B brings the second counterpart sealing surface 11S of the second stationary seal ring 11 into press contact with the second sealing surface 2B by repulsive force thereof, as well as sealing the gap between the second tapered surface 11K and the second opposed tapered surface 18B. In the space 62C between the first and second O-rings 15A and 15B, the fluid passage 6 communicatively connected to the first connecting fluid passage 6B is formed.

Also, the O-rings 15A and 15B elastically press the first and second stationary seal rings 10 and 11, which are symmetrical to each other, in directions opposed to each other, respectively, so that it is not necessary to provide metal springs for respectively pressing the first and second stationary seal rings 10 and 11, differently from a conventional art. This can prevent malfunction of the pressed first and second stationary seal rings 10 and 11 due to corrosion of the springs. Also, such configuration can reduce the number of components of the first mechanical seal M1. Further, the first and second O-rings 15A and 15B not provided with any slidable sealing surface make it possible to seal the supply fluid H such as slurry or chemical solution without any problem. Still further, a partition ring 9 is fitted in the inner circumferential surface of the housing 60 so as to partition the fluid passage 6. The partition ring 9 is provided with a large number of communicatively connecting fluid passages 6A and 6A partially constituting the fluid passage 6. The fluid passage 6 formed in the space 62C between a configuration of the first O-ring 15A, first sealing surface 2A, and first counterpart sealing surface 10S on one side of the first mechanical seal M1 and a configuration of the second O-ring 15B, second sealing surface 2B, and second counterpart sealing surface 11S on the other side allows a communicative connection between the fluid passage 6 and the first connecting fluid passage 6B to be made even while the housing 60 and the rotary shaft 50 are relatively rotating.

Next, FIG. 2 is a front view illustrating the other end surface 30B of the sleeve 30. Inside the sleeve 30, the radially second connecting fluid passage 6C1 communicatively connected to the first connecting fluid passage 6B, and the second connecting fluid passage 6C formed in a cross-sectional L-shape that is bent from the radially second connecting fluid passage 6C1 toward the shaft direction passage are formed. The second connecting fluid passage 6C is formed as a long hole, and passes to the other end surface 30B (see FIG. 1) as cross-sectionally viewed. Further, inside the sleeve 30, a cross-sectionally L-shaped second connecting vacuum passage 16C is also formed in a position circumferentially apart from the second connecting fluid passage 6C. The second connecting vacuum passage 16C also passes to the other end surface 30B. The sleeve 30 is formed into a cylindrical body with the use of stainless steel, which is a rustless material. Alternatively, the sleeve 30 is fabricated from the other rustless material such as ceramic, or hard resin as the other material. An inner circumferential surface 30C of the sleeve 30 is fitted into the outer circumferential surface 50D of the rotary shaft 50 with the one end surface 30E being locked into a stepped surface provided on the outer circumferential surface 50D. On both shaft-direction sides of a fitting portion between the inner circumferential surface 30C of the sleeve 30 and the outer circumferential surface 50D of the rotary shaft 50, O-rings 34A and 34B may be provided to prevent water from intruding into the fitting portion. Also, the sleeve 30 is locked into and fixed to the rotary shaft 30 with a key 65 implanted in a key groove 50K on the rotary shaft 50 so as to be simultaneously rotatable. Further, on the other end surface 30B side of the sleeve 30, a pin hole 30H and screw holes 30W are provided.

FIG. 3 is a front view of a joining surface 20H side of the connection part 20. The following description is given with reference to FIGS. 1 to 3. By screwing an inner circumferential surface 20S of the flanged connection part 20 into a screw part on the outer circumferential surface of the rotary shaft 50 with respect to the above-described sleeve 30, or joining the joining surface 20H of the connection part 20 to the outer circumferential surface on the other end surface 30B side and screwing unshown bolts into the screw holes 30W (see FIG. 2) provided on the sleeve 30, the connection part 20 is coupled with the other end surface 30B of the sleeve 30. At this time, alignment is performed so as to communicatively connect the connecting fluid passage 6C and connecting vacuum passage 16C in the sleeve 30 and those 6D and 16A in the connection part 20 to each other, respectively, with a pin driven into the joining surface 20H being engaged with the pin hole 30H. Further, a nut 51 is screwed into a screw hole on the outer circumference of the rotary shaft 50 to firmly fix the connection part 20.

In the connection part 20, the third connecting fluid passage 6D communicatively connected to the second connecting fluid passage 6C is formed. Around the third connecting fluid passage 6D on the joining surface 20H, an O-ring groove 20B is formed. In the O-ring groove 20B, an O-ring 31 is fitted to seal a joining portion between the joining surface 20H and the other end surface 30B of the sleeve 30. In the connection part 20, the third connecting vacuum passage 16A communicatively connected to the second connecting vacuum passage 16C is also formed. A joining portion between the second and third connecting vacuum passages 16C and 16A is also provided with an unshown O-ring, similarly to the O-ring 31. Note that a contact area between the other end surface 30B of the sleeve 30 and the joining surface 20H of the connection part 20 is small, and also there is no fitting portion with a long cylindrical surface, so that the both components can be easily disassembled. Also, the connection part 20 is fabricated from stainless steel. However, a material for the connection part 20 may be steel, copper alloy, chromium-based alloy, nickel-based alloy, or the like.

In a position within the housing 60 facing to a radially second connecting vacuum passage 16C1 of the second connecting vacuum passage 16C, the vacuum passage 16 is provided. The vacuum passage 16 is intended for introducing the vacuum B. Between the vacuum passage 16 and the radially second connecting vacuum passage 16C1, a first connecting vacuum passage 16D of the radial direction communicatively connected to the radially second connecting vacuum passage 16C1 of the second connecting vacuum passage 16C is formed in a second rotary seal ring 3 hermetically fitted in the sleeve 30. As a result, the second mechanical seal M2 allows a communicative connection between the vacuum passage 16 and the second connecting vacuum passage 16C to be made without intrusion of external fluid even during the relative rotation. The mechanical seal M2 is configured such that a third sealing surface 3S1 is formed on one of shaft direction end surfaces of the second rotary seal ring 3 hermetically fitted in the outer circumferential surface 30A of the sleeve 3, and a fourth sealing surface 3S2 is formed on the other one of the shaft direction end surfaces. In addition, the second rotary seal ring 3 is fixed to the sleeve 30 with a second drive pin, similarly to the first rotary seal ring 2. That is, by fitting a second O-ring 32B into an O-ring groove of the second drive pin, a fitting portion between the second drive pin and a second fixing hole is sealed to thereby prevent the external fluid from intruding onto the outer circumferential surface 50D of the rotary shaft 50 and into the first connecting vacuum passage 16D.

Further, a third opposed sealing surface 4S provided on an end surface of a third fixed seal ring 4 hermetically fitted in the housing 60 is brought into close contact with the third sealing surface 3S1. Also, a fourth opposed sealing surface 5S provided on an end surface of a fourth fixed seal ring 5 hermetically fitted in the housing 60 is brought into close contact with the fourth sealing surface 3S2. Further, the third and fourth opposed sealing surfaces 4S and 5S are respectively brought into slidably close contact with the third and fourth sealing surfaces 3S1 and 3S2 to configure the entire vacuum passage 16 in which the vacuum passage 16 and the first connecting vacuum passage 16D can be communicatively connected to each other even while the sleeve 30 rotating together with the rotary shaft 50 is rotating relative to the housing 60. In addition, the second rotary seal ring 3, third fixed seal ring 4, and fourth fixed seal ring 5 are fabricated from a rustless material such as silicon carbide, carbon, ceramic, Ni, or Cr-based hard alloy, as a material. Note that the first and second connecting vacuum passages 16D and 16C, and third vacuum passage 16A are differently named; however, the passages are referred to as the vacuum passage 16 as a whole.

Further, the passage 26 for flowing the cooling and cleaning fluid C provided in the housing 60 is provided with a first passage 26A that passes between the outer circumferential surface 30A of the sleeve 30 and the inner circumferential surface of the housing 60 and is communicatively connected to a space partitioned by a close-contact surface between the second counterpart sealing surface 11S of the second stationary seal ring 11 and the second sealing surface 2B of the first rotary seal ring 2, and those with which both sides of the second O-ring 15B come into close contact. Still further, a passage hole is formed in the housing 60 in the shaft direction from the first passage 26A, and a plurality of the passage holes provided in the circumferential direction are formed as second passages 26C. Yet further, a third passage 26D is formed, which is communicatively connected to a communicating passage between the inner circumferential surface of the housing 60 and the outer circumferential surface of the sleeve 30 on an inner circumferential side of the fourth fixed seal ring 5 from the second passages 26C through a communicating passage on a side surface side of the fourth fixed seal ring 5, and also communicatively connected to a space partitioned by a close-contact surface between the fourth opposed sealing surface 5S of the fourth fixed seal ring 5 and the fourth sealing surface 3S2 of the second rotary seal ring 3, that between the first counterpart sealing surface 10S of the first stationary seal ring 10 and the first sealing surface 2A of the first rotary seal ring 2, and both close-contact surfaces of the first O-ring 15A.

Also, from the third passage 26D, a fourth passage 26E is formed, which is formed as a hole passage that is provided in the housing 60 and indicated by a hidden line. Further, a fifth passage 26B is formed, which is communicatively connected to a space partitioned by the third opposed sealing surface 4S of the third fixed seal ring 4 and the third sealing surface 3S1 of the second rotary seal ring 3, and intended for discharging. Note that the fifth passage 26B is closed with a blind cap in the diagram; however, unshown external piping and a pipe thread provided for the same fifth passage 26B at a different position on the circumferential line are connected to each other. As a result, the cooling and cleaning fluid (clear water or cooling gas) C flowing through the passage 26 cools the sealing surfaces (outsides of the fluid and vacuum passages 6 and 16) of the respective seal rings of the first and second mechanical seals M1 and M2, as well as cleaning them to allow the first and second mechanical seals M1 and M2 to exert sealing capability.

The supply fluid H, which is the polishing agent solution containing polishing powder supplied through the fluid passage 6 of the rotary joint 1, flows through the fluid passage 6 and the first connecting fluid passage 6B, and is introduced into the second connecting fluid passage 6C by the mechanical seal M1 even while the housing 60 and the rotary shaft 50 fitted in with the sleeve 30 are relatively rotating. Subsequently, the supply fluid H flows through the second connecting fluid passage 6C in the sleeve 60, then reaches the third connecting fluid passage 6D provided in the connection part 20, and is supplied to unshown polishing equipment. For this reason, the supply fluid H composed of the polishing agent solution does not pass across the fitting portion between the rotary shaft 50 and the sleeve 30, and therefore does not intrude into the fitting portion between the rotary shaft 50 and the sleeve 30. As a result, the appearance of rust on the fitting surfaces of the rotary shaft 50 and sleeve 30 can be prevented. Also, the supplying device for supplying the fluid C composed of the cleaning and cooling fluid is communicatively connected to the passage 26 in the rotary joint 1 via piping, and the clear water flowing in from the supplying device via the passage 26 cools and cleans the first and second mechanical seals M1 and M2.

In this manner, the fitting portion between the sleeve 30 and the rotary shaft 50 can be adapted to prevent the supply fluid H or impurities from intruding thereinto, and also the respective components can be adapted to be easily disassembled. Further, the fitting portion between the sleeve 30 and the rotary seal ring 2 is sealed from the intrusion of the sealed fluid by both of the O-rings 32 and 32, and therefore can also be prevented from rust. Still further, if one of the both fitting components is made of a rustless material, the both components can be effectively prevented from tightly adhering to each other because the one component made of the rustless material does not rust. Yet further, the first rotary seal ring 2, first and second stationary seal rings 10 and 11, second rotary seal ring 3, and third and fourth fixed seal rings 4 and 5 are made of silicon carbide or a carbon material, which is equivalent to the rustless material because it does not rust. The rustless material does not rust as much as the components cannot be disassembled, and further each of the seal rings 2, 10, 11, 3, 4, and 5 is configured to be locked into with the drive pin, or elastically supported at the fitting portion thereof with the O-ring to be thereby able to shorten the fitting surface in the shaft direction, so that the disassembly can be easily performed. In addition, the respective O-rings 32, 32A, 32B, and so on illustrated in FIG. 1 are made of a rubber or resin material, similarly to the first and second O-rings 15A and 15B.

Inventions respectively having the other embodiments according to the present invention are described below in terms of their configurations and working effects.

A rotary joint of a first invention according to the present invention is configured such that a first stationary seal ring has a first tapered surface formed on a rear surface on a side opposite to a first sealing surface and is adapted to be able to press the first sealing surface; a second stationary seal ring has a second tapered surface formed on a rear surface on a side opposite to a second sealing surface and is adapted to be able to press the second sealing surface; the first stationary seal ring having been hermetically held comprises a first elastic seal ring for sealing between the first tapered surface and a first opposed tapered surface in a fixed part and pressing a first counterpart sealing surface toward the first sealing surface, the first opposed tapered surface facing to the first tapered surface; and the second stationary seal ring having been hermetically held comprises a second elastic seal ring for sealing between the second tapered surface and a second opposed tapered surface in a fixed part and pressing a second counterpart sealing surface toward the second sealing surface, the second opposed tapered surface facing to the second tapered surface.

According to the rotary joint of the first invention, each of the stationary seal rings has no fitting surface, and each of the elastic seal rings is joined to a flat surface at a joining surface thereof as a curved surface and made of a rubber-like elastic material, allowing an easily removable configuration without rust. Also, a rotary seal ring is sandwiched between the both stationary seal rings and removably fitted in, and further a fitting portion between the rotary seal ring and a rustless sleeve can prevent both of the components from tightly adhering to each other. That is, if one of the joining components does not rust, a joining surface can be prevented from adhering due to the rust making it difficult for the joining surface to be removed. For this reason, the rotary seal ring can be easily removed from the sleeve. Accordingly, if the sleeve is removed from the rotary shaft, an effect capable of easily disassemble a whole of components of the mechanical seal is produced.

A rotary joint of an second invention according to the present invention is configured such that a second connecting fluid passage is communicatively connected to a first connecting fluid passage at one end part thereof; passes to other end surface through an inside of a sleeve; and is communicatively connected to a third connecting fluid passage formed inside a flanged connection part coupled with the other end surface side of the sleeve.

According to the rotary joint of the second invention, the second connecting fluid passage passes inside the cylindrical sleeve, and therefore can be freely formed in size as multiple pieces along a circumference inside the sleeve formed larger than a rotary shaft in diameter or as a long hole having an arc-like cross-section, allowing a high flow rate. Further, the third connecting fluid passage can be radially formed outward from the other end surface of the sleeve through the flanged connection part, so that multiple fluid passages can be formed for each of the fluid passages, and therefore multiple connections between the third connecting fluid passage and a processing device can be easily made. Still further, a joining surface between the other end surface of the rustless sleeve and the connection part is based on end surface joining, and also the other end surface has less rust, so that the both components can be easily disassembled. Yet further, the second connecting fluid passage provided in the sleeve made of a rustless material prevents rust or the like from being mixed into a process fluid, so that attachment of impurities onto a surface of a precisely machined article can also be prevented.

A rotary joint of a third invention according to the present invention is configured such that a fitting portion between an inner circumferential surface of a rotary seal ring and an outer circumferential surface of a sleeve has O-rings on both sides of a communicative connection between a second connecting fluid passage and a first connecting fluid passage.

According to the rotary joint of the third invention, the O-rings are provided on the both sides of the fluid passage in the fitting portion between the inner circumferential surface of the rotary seal ring and the outer circumferential surface of the sleeve, and therefore can prevent sealed fluid from intruding into the fitting portion between the inner circumferential surface of the rotary seal ring and the outer circumferential surface of the sleeve. Also, rust can be prevented from appearing and causing adhesion in the fitting portion, so that the rotary seal ring can be easily removed from the sleeve upon disassembly of a mechanical seal.

A rotary joint of a fourth invention according to the present invention is configured such that a rotary seal ring is locked into a sleeve by a drive pin fitted in an engaging hole passing through the sleeve and the rotary seal ring, and the drive pin is arranged between both O-rings.

According to the rotary joint of the fourth invention, the rotary seal ring is fixed to the sleeve by the drive pin, so that a fitting length in a shaft direction can be shortened. Also, the rotary seal ring is fixed to the sleeve by the drive pin, and therefore can be loosely fitted into the sleeve via the O-rings. For these reasons, the rotary seal ring can be very easily removed from the sleeve upon disassembly of a mechanical seal, so that an effect capable of reducing cost for the disassembly or assembly is produced.

INDUSTRIAL APPLICABILITY

The rotary seal ring of the present invention is configured such that each of assembled components does not rust, and therefore useful because disassembly/assembly can be easily performed upon replacement of the component. Also, rust or the like is not mixed into process fluid, so that the rotary joint is a useful one that does not make defective a functional surface having been machined.

The invention claimed is:

1. A rotary joint circulating supply fluid without leaking said supply fluid outside a fluid passage upon relative rotation of a fluid passage in a housing as a fixed part and a fluid passage in a sleeve joined to a rotary shaft to rotate together with said rotary shaft, in which said supply fluid does not intrude into a joining portion between said sleeve and said rotary shaft, said fluid passage being formed inside said sleeve, the rotary joint comprising:
    said housing having said fluid passage through which said supply fluid flows;
    a partition ring fitted in an inner circumferential surface of said housing, said partition ring being provided with a communicatively connecting fluid passage forming a part of said fluid passage;
    the sleeve being made from a rustless material, the sleeve having a second connecting fluid passage therein through which said supply fluid from said fluid passage in said housing flows, and having an inner circumferential surface that is fitted onto an outer circumferential surface of said rotary shaft;
    a rotary seal ring having:
        an inner circumferential surface fitted onto an outer circumferential surface of said sleeve;
        a first connecting fluid passage passing through said inner circumferential surface to communicatively connect said second connecting fluid passage and said communicatively connecting fluid passage;
        a first sealing surface on one side surface, and
        a second sealing surface on other side surface;
    a first stationary seal ring having a first counterpart sealing surface contacting said first sealing surface, and hermetically held by said fixed part; and
    a second stationary seal ring having a second counterpart sealing surface contacting said second sealing surface; hermetically held by said fixed part.

2. The rotary joint according to claim 1, wherein said first stationary seal ring has a first tapered surface formed on a rear surface on a side opposite to said first sealing surface, and is adapted to be able to press said first sealing surface;
    said second stationary seal ring has a second tapered surface formed on a rear surface on a side opposite to said second sealing surface, and is adapted to be able to press said second sealing surface;
    said first stationary seal ring having been hermetically held comprises a first elastic seal ring for sealing between said first tapered surface and a first opposed tapered surface in said fixed part and pressing said first counterpart sealing surface toward said first sealing surface, the first opposed tapered surface facing said first tapered surface; and
    said second stationary seal ring having been hermetically held comprises a second elastic seal ring for sealing between said second tapered surface and a second opposed tapered surface in said fixed part and pressing said second counterpart sealing surface toward said second sealing surface, the second opposed tapered surface facing said second tapered surface.

3. The rotary joint according to claim 1, wherein said second connecting fluid passage is communicatively connected to said first connecting fluid passage at one end part thereof; passes to other end surface through an inside of said sleeve; and is communicatively connected to a third connecting fluid passage formed inside a flanged connection part coupled with said other end surface side of said sleeve.

* * * * *